United States Patent [19]
Masui et al.

[11] Patent Number: 5,714,175
[45] Date of Patent: Feb. 3, 1998

[54] APPARATUS FOR PRODUCING A MULTILAYER MOLDED ARTICLE

[75] Inventors: Shohei Masui, Aichi; Masahito Matsumoto, Osaka; Nobuhiro Usui, Osaka; Toshihiro Hosokawa, Osaka; Ryuichi Ishitsubo, Ryuichi, all of Japan

[73] Assignees: Sumitomo Chemical Co., Ltd.; Hosokawa Seisakusho Co., Ltd., both of Osaka, Japan

[21] Appl. No.: 565,245

[22] Filed: Nov. 30, 1995

Related U.S. Application Data

[62] Division of Ser. No. 174,757, Dec. 29, 1993, Pat. No. 5,509,990, which is a continuation of Ser. No. 883,907, May 13, 1992, abandoned, which is a continuation of Ser. No. 457,313, Dec. 26, 1989, abandoned.

[30] Foreign Application Priority Data

Dec. 27, 1988 [JP] Japan .................. 63-334088

[51] Int. Cl.$^6$ .................. B29C 39/12
[52] U.S. Cl. .................. 425/123; 156/242; 156/245; 264/46.4; 264/247; 264/257; 425/111
[58] Field of Search .................. 425/111, 112, 425/123; 264/46.4, 46.6, 247, 257, 259, 129.1, 275, 278, 263; 156/242, 245, 213, 214

[56] References Cited

U.S. PATENT DOCUMENTS

| | | |
|---|---|---|
| 2,997,639 | 4/1961 | Barkhuff . |
| 3,258,511 | 6/1966 | McGregor . |
| 4,829,644 | 5/1989 | Kondo . |

(List continued on next page.)

FOREIGN PATENT DOCUMENTS

| | | |
|---|---|---|
| 186015 | 7/1986 | European Pat. Off. . |
| 186016 | 7/1986 | European Pat. Off. . |
| 2439525 | 10/1978 | France . |

(List continued on next page.)

OTHER PUBLICATIONS

Patent Abstract of Japan, vol. 10, No. 115 (M–474) 2172, 30th Apr. 1986.
JP-A-60–244 522 (NIHON) Apr. 12, 1985, Abstract only, firgures.
Patent Abstract of Japan, vol. 11, No. 64 (M–565) 2511, 26th Feb. 1987.
JP-A-61 220 822 (MEIWA SANGYO) Jan. 10, 1986, Abstract only, figures.
Patent Abstracts of Japan, vol. 9, No. 303 (M–434) 2026, 30th Nov. 1985.
JP-A-60 141 524 (AIDA), 26, Jul. 1985, Abstract only, figures.
Patent Abstracts of Japan, vol. 8, No. 280 (M–347), 21st Dec. 1984.
JP-A-59 150 740 (SUMITOMO) 29, Aug. 1984, figures.
Patent Abstracts of Japan, vol. 4, No. 158 (M–39) 640, 5th Nov. 1980.
JP-A-55 107436 (IKEDA) 18, Aug. 1990, Abstract, figures.
Patent Abstracts of Japan, vol. 10, No. 115 (M–474) 2127, 30th Apr. 1986.
JP-A-60 244 526 (NIHON) Apr. 12, 1985, Abstract, figures.
Patent Abstracts of Japan, vol. 6, No. 232 (M–172) 1110, 18th Nov. 1982.
JP-A-57 133 019 (KASAI KOGYO) 17, Aug. 1982, Abstract, figures.

*Primary Examiner*—Jay H. Woo
*Assistant Examiner*—Iurie A. Schwartz
*Attorney, Agent, or Firm*—Birch, Stewart, Kolasch & Birch, LLP

[57] ABSTRACT

An apparatus for producing a multilayer molded article including a resin body and at least one sheet of a skin material, an edge part of which is present in a surface area of the resin body. The apparatus includes a mold, and a clamping device for clamping an edge part of a skin material or mated edge parts of adjacent skin materials during molding.

12 Claims, 4 Drawing Sheets

U.S. PATENT DOCUMENTS

| | | | |
|---|---|---|---|
| 4,833,741 | 5/1989 | Mizuno . | |
| 4,861,543 | 8/1989 | Rafferty . | |
| 5,013,090 | 5/1991 | Matsuura | 264/275 |
| 5,053,179 | 10/1991 | Masui et al. . | |
| 5,500,169 | 3/1996 | Kondo et al. | 264/46.6 |
| 5,543,094 | 8/1996 | Hara et al. | 264/257 |

FOREIGN PATENT DOCUMENTS

| | | |
|---|---|---|
| 833118 | 3/1952 | Germany . |
| 3704528 | 2/1988 | Germany . |
| 3743318 | 12/1988 | Germany . |
| 333198 | 9/1989 | Japan . |
| 2190621 | 11/1987 | United Kingdom . |

APPARATUS FOR PRODUCING A MULTILAYER MOLDED ARTICLE

This application is a divisional of application Ser. No. 08/174,757, filed Dec. 29, 1993, now U.S. Pat. No. 5,509,990, the entire contents of which are hereby incorporated by reference, which is a continuation of application Ser. No. 07/883,907, filed May 13, 1992, now abandoned, which is a continuation of application Ser. No. 07/457,313, filed Dec. 26, 1989, now abandoned.

BACKGROUND OF THE INVENTION

1. Field of the Invention

The present invention relates to a process and a mold for producing a multilayer molded article comprising a resin body and at least one sheet of a skin material having its edge part in the surface area of the resin body.

2. Description of the Related Art

A multilayer molded article comprising a resin body and a skin material laminated on the resin body has good appearance due to its high quality and warm feeling. The multilayer molded article greatly improves textures of a resin molded article such as cool feeling and provides an article with high value and beauty.

In fact, the multilayer molded articles are widely used as automobile interior materials or furnishing materials.

To improve an ornamental effect of the multilayer molded article comprising the skin material, it is desired to laminate two or more sheets of the skin materials on one surface of the resin body or to laminate one sheet of the skin material on a part of the surface of the resin body. However, the conventional processes or molds for producing the multilayer molded article cannot produce such an improved multilayer molded article. The mating edges of two sheets of the skin materials or the free edge of the skin material covering a part of the surface of the resin body cannot be beautifully finished.

SUMMARY OF THE INVENTION

One object of the present invention is to provide a process for producing a multilayer molded article comprising a resin body and at least two sheets of skin materials which are laminated on one surface of the resin body.

Another object of the present invention is to provide a process for producing a multilayer molded article comprising a resin body and one sheet of a skin material laminated on a part of a surface of the resin body.

A further object of the present invention is to provide a mold for producing a multilayer molded article comprising a resin body and at least two sheets of skin materials which are laminated on one surface of the resin body.

A yet further object of the present invention is to provide a mold for producing a multilayer molded article comprising a resin body and one sheet of a skin material laminated on a part of a surface of the resin body.

According to a first aspect of the present invention, there is provided a process for producing a multilayer molded article comprising a resin body and at least two sheets of skin materials which are laminated on one surface of the resin body, which process comprises steps of:

mating an edge part of one of the adjacent skin materials on an edge part of another, clamping the mated edge parts and spreading the skin materials between a male mold and a female mold, supplying a mass of resin melt between the skin materials and the mold which is located on a side on which the clamped edge parts are present, and closing the male and female molds to form the multilayer molded article.

According to a second aspect of the present invention, there is provided a process for producing a multilayer molded article comprising a resin body and one sheet of a skin material laminated on a part of a surface of the resin body, which process comprises steps of:

clamping an edge part of the skin material and spreading the rest of the skin material between a male mold and a female mold, supplying a mass of resin melt between the skin material and the mold which is located on a side on which the clamped edge part is present, and closing the male and female molds to form the multilayer molded article.

According to a third aspect of the present invention, there is provided a mold for practicing the processes of the present invention, which comprises a male mold, a female mold and clamping means for clamping an edge part of a skin material or mated edge parts of adjacent skin materials.

DETAILED DESCRIPTION OF THE DRAWINGS

Figure 1:
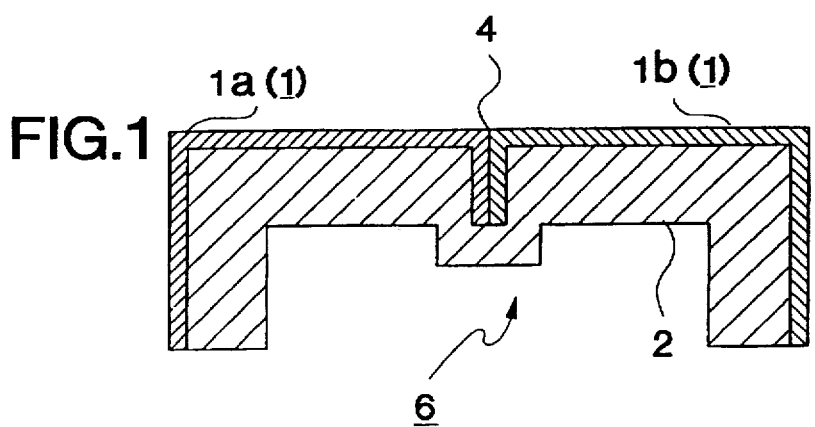
FIG. 1 shows a cross section of a multilayer molded article comprising a resin body and two sheets of skin materials which are laminated on one surface of the resin body.

FIG. 1 shows a cross section of a multilayer molded article 6 which comprises a resin body 2 and a skin material 1 consisting of two sheets of skin materials 1a and 1b the edge parts 4 of which are mated together.

Figure 2:
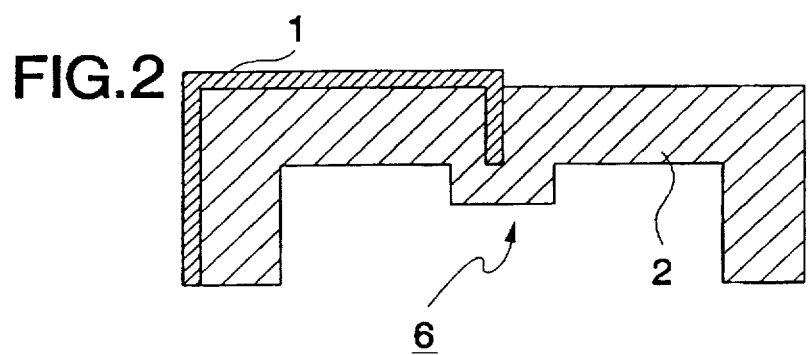
FIG. 2 shows a cross section of a multilayer molded article comprising a resin body and one sheet of a skin material which is laminated on a part of a surface of the resin body, FIGS. 3, 4 and 5 schematically show the process for producing a multilayer molded article comprising a resin body and at least two sheets of skin materials which are laminated on one surface of the resin body according to the present invention.
Figure 3:
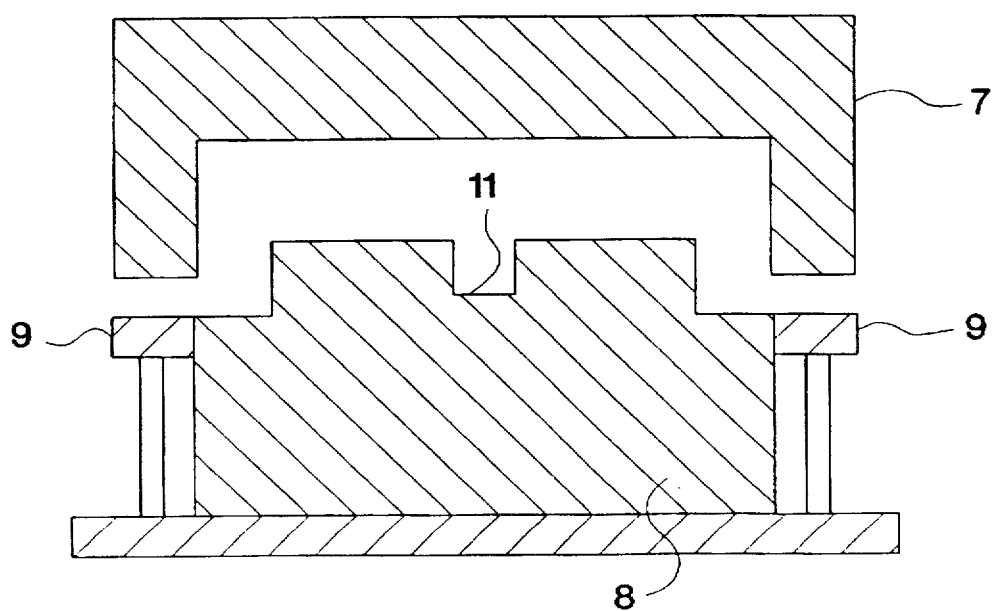

FIG. 2 shows a cross section of a multilayer molded article 6 which comprises a resin body 2 and one sheet of a skin material 1 laminated on a part of a surface of the resin body 2.

In the present invention, the skin material may be any of conventionally used materials. Specific examples of the skin material are woven or non-woven fabric, nets made of metals, fibers or thermoplastic resins, paper, metal foils, and a sheet or a film of a thermoplastic resin or elastomer. The skin material may be decorated with uneven patterns such as grain patterns, printing, dying and the like. In addition, the skin material may be made of foamed materials of thermoplastic resins or rubbers. Also, a laminate comprising at least two layers each made of the same material or different materials which are bonded to each other with an adhesive can be used as the skin material. Before the skin material is supplied in the mold, a part or whole of the skin material may be preheated to adjust tensile stress and elongation.

As the resin to be molded by the process of the present invention, any of the conventional resins used in compression molding, injection molding and extrusion molding can be used. Specific examples of the resin are non-expandable or expandable resins of thermoplastic resins (e.g. polypropylene, polyethylene, polystyrene, acrylonitrile-styrene-butadiene copolymer, nylon, etc.), and thermoplastic elastomers (e.g. ethylene-propylene copolymer, styrene-butadiene copolymer, etc.). The resin may contain at least one additive such as fillers (e.g. inorganic fillers and glass fibers), pigments, lubricants, antistatic agents and the like.

When two or more sheets of the skin materials are used, the mated edge parts may be bonded together with an adhesive or by welding. Since the bonding strength with the adhesive or by welding is not sufficient to resist a pulling force during the molding of the multilayer molded article, the mated edge parts are ruptured, torn or displaced. Therefore, the mated edge parts should be clamped.

The mold for producing the multilayer molded article according to the present invention will be discussed by making reference to FIGS. 3 through 7.

The mold comprises a female mold 7, a male mold 8, clamping means P for holding the mated edge parts 4 of the skin materials 1a and 1b or the free edge part 4 of the skin material, and an engaging groove 11 for receiving the clamping means.

The clamping means P has a part Pa for clamping the skin material edge part(s), and consists of alternately positioned wide parts Ph and narrow parts Pn. In the narrow parts Pn, there is no gap between the mated edges of the skin materials and the clamping part Pa, as shown in FIG. 6C, to precisely position the skin materials. Therefore, no resin melt can reach between the skin materials and the clamping part Pa. In the wide parts Ph, conduits P1 are formed between the skin materials and the clamping part Pa for passing the resin melt therebetween, as shown in FIG. 6B.

Around the mold, a clamping frame 9 is provided to hold the skin material.

Figure 5:
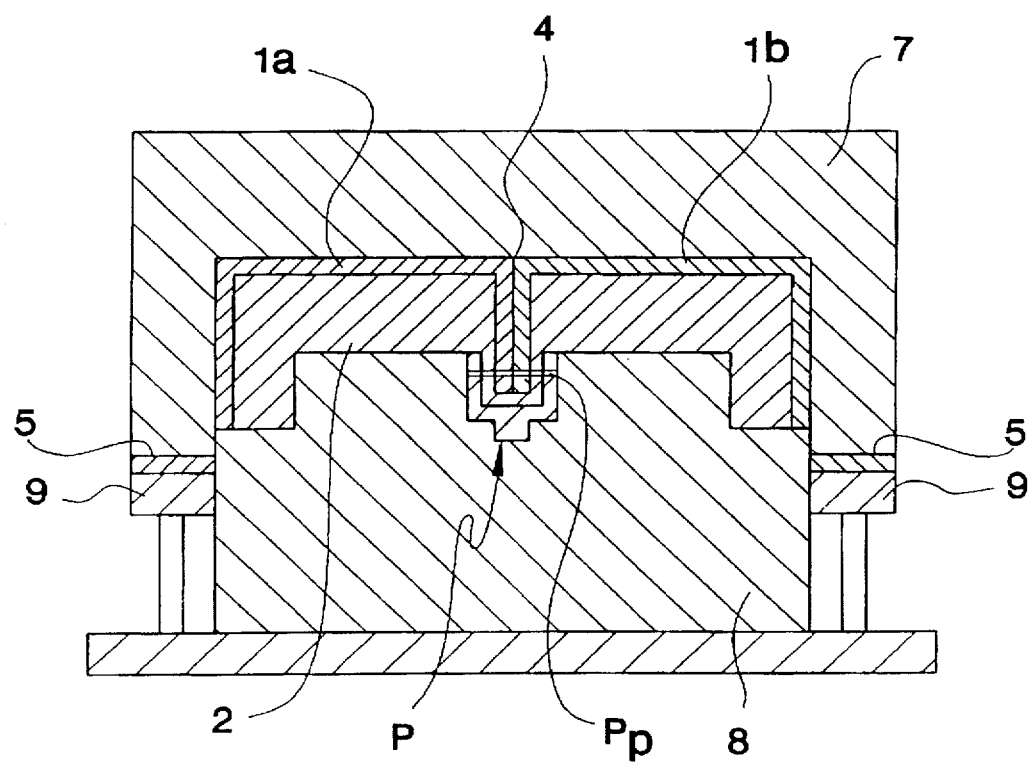
Figure 6A:
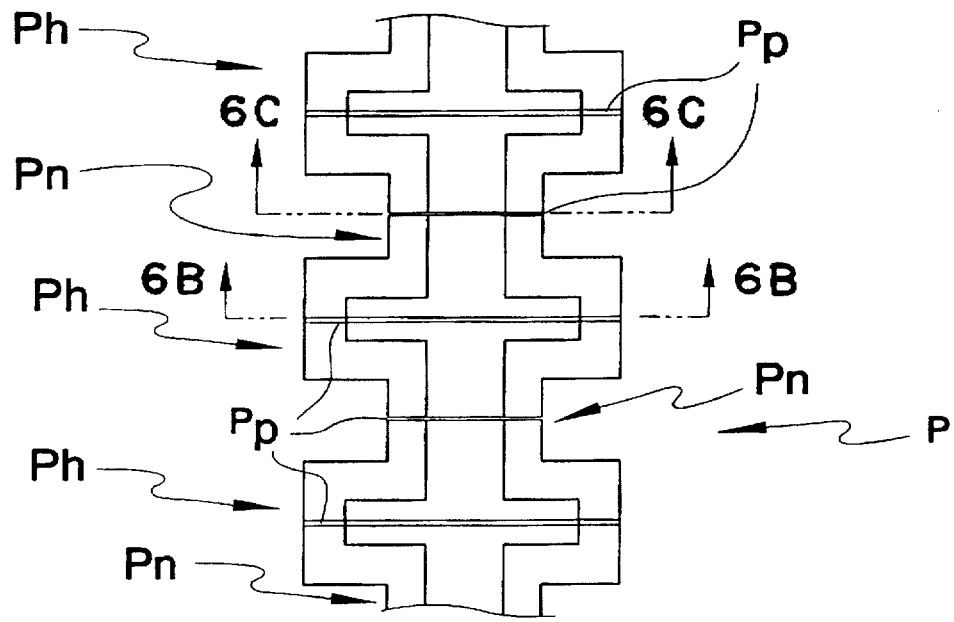
FIG. 6A shows a plan view of the clamping means for clamping the edge parts of the skin materials.
Figure 6B:
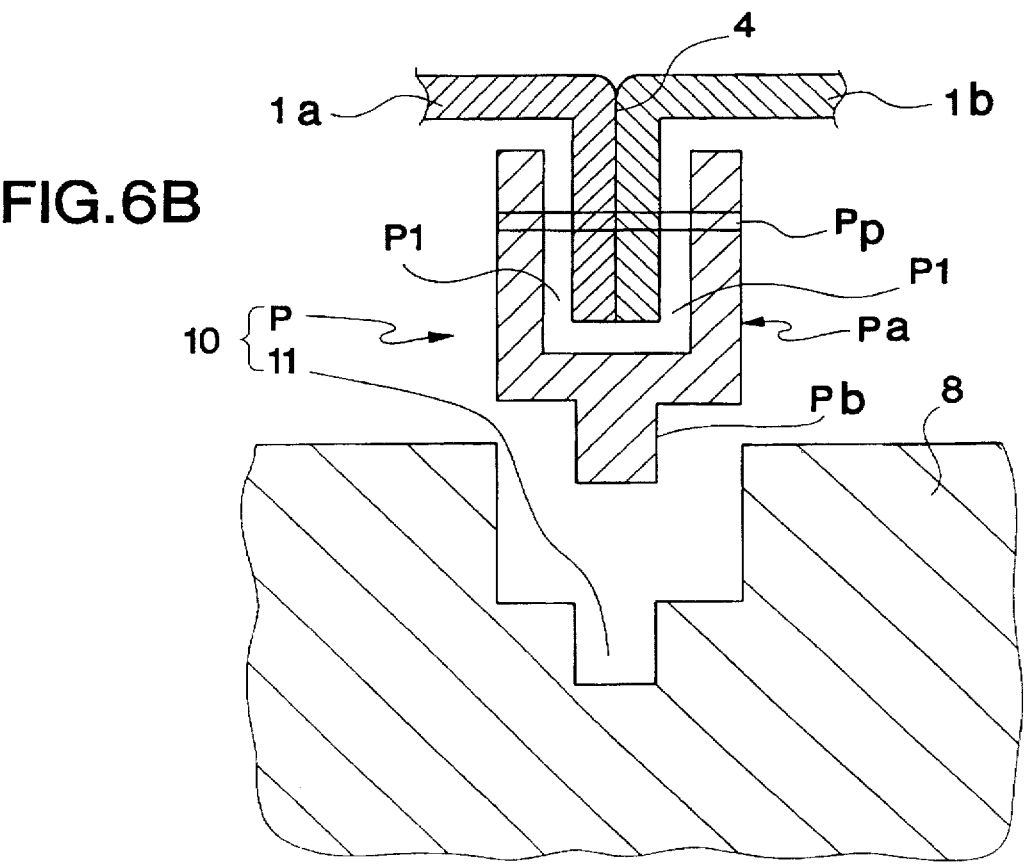
FIGS. 6B and 6C show cross sections of the clamping means of FIG. 6A along the lines A—A and B—B, respectively.
Figure 6C:
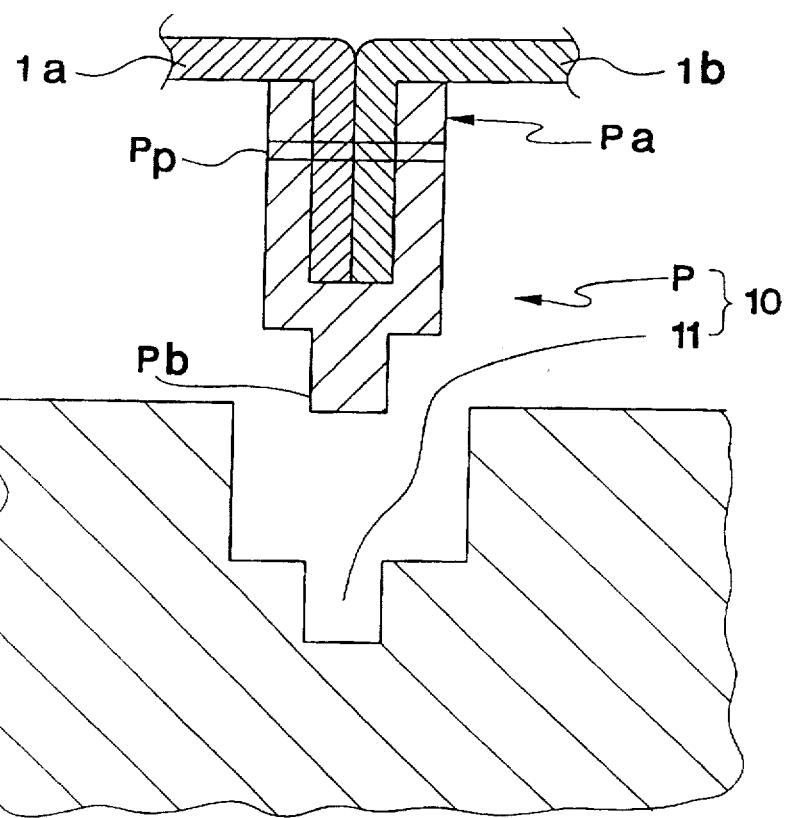

In the embodiment of FIGS. 5 and 6, the male mold 8 has a mechanism 10 for fixing the clamping means P. The mechanism 10 consists of the engaging groove 11 and the part Pa for clamping the skin material edge part(s), and the part Pb is inserted in the groove 11 to fix the clamping means P to the mold 8. Although the groove 11 is shown in the male mold 8, it should be understood that the groove 11 for receiving the clamping means P may be provided in the female mold 7 instead of the male mold 8.

By using the mold shown in FIGS. 5 and 6, the multilayer molded article having two sheets of the skin materials 1a and 1b is produced as follows:

First, the edge parts of the skin materials 1a and 1b are mated against each other and optionally bonded together. The mated edge parts are held in the parts Pa with pins Pp. Then, the clamping means P is inserted in the groove 11.

Figure 4:
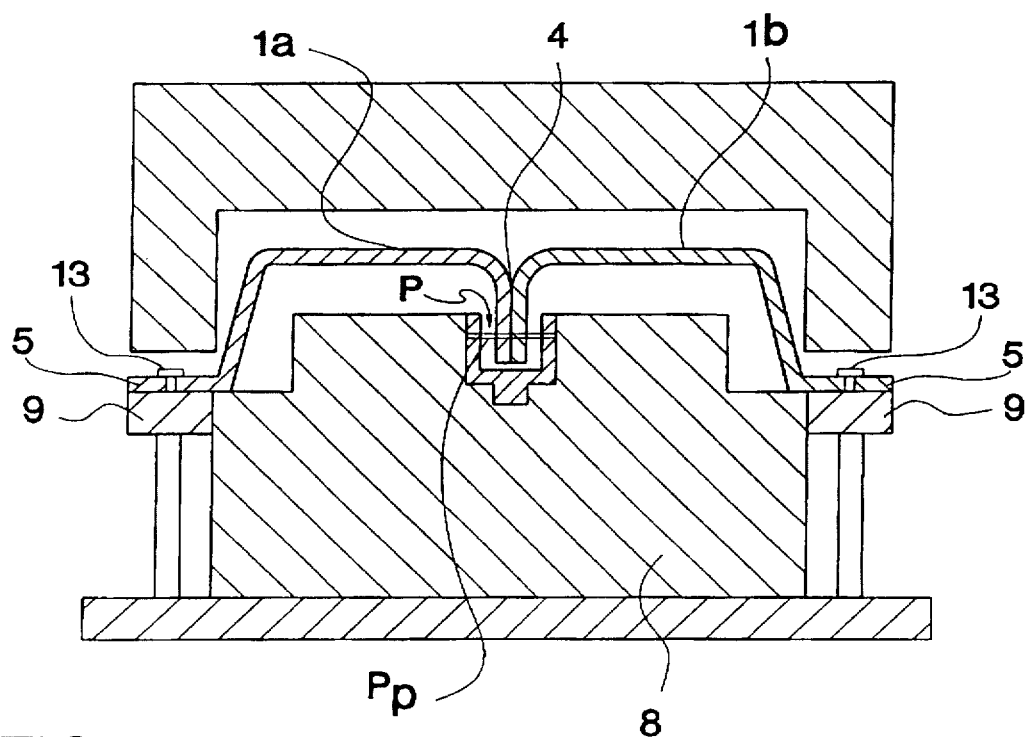

The periphery of the skin materials is placed on the clamping frame 9 and fixed with pins 13 (see FIG. 4).

The resin melt is supplied between the skin materials 1 and the mold 8. When the molds are closed, the supplied resin melt flows and spreads over the inner surface of the mold 8 through the conduits P1.

Finally, the molds 7 and 8 are completely closed to finish the molding of the multilayer molded article. After molding is completed, the molds 7 and 8 are opened, the multilayer molded article is removed from the molds, and the pins Pp are removed from the multilayer molded article.

Figure 7:
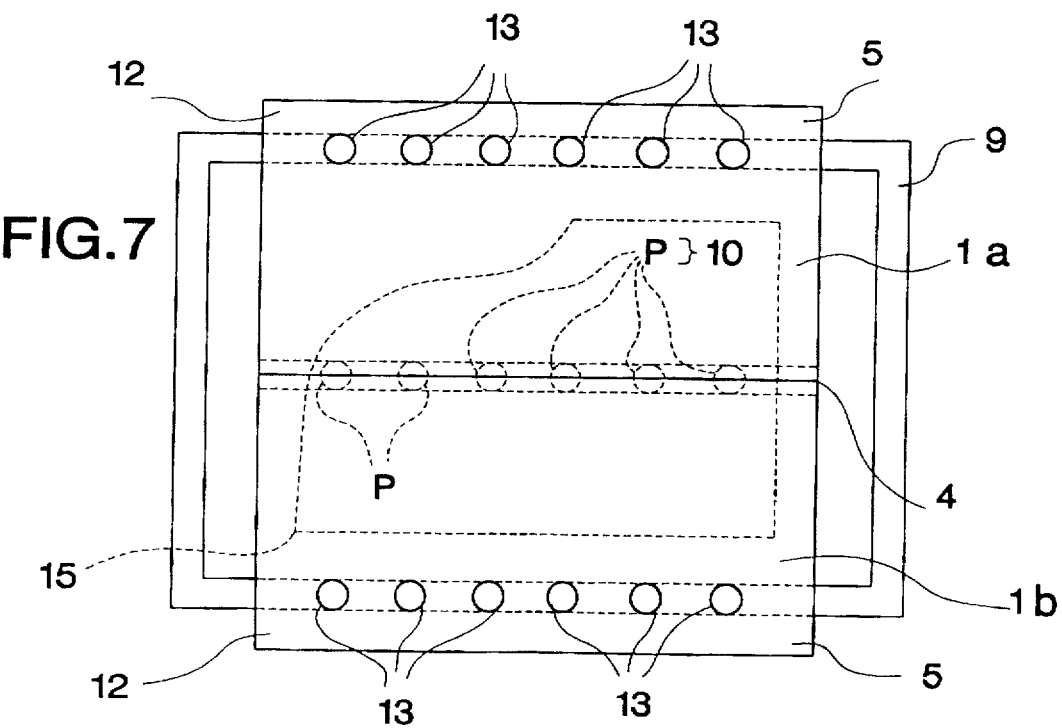
FIG. 7 shows a plan view of the clamped skin materials placed on the male mold.

FIG. 7 shows a plan view of the skin materials placed on the male mold 8. The broken like 15 indicates the periphery of the cavity. If necessary, marginal parts are cut out with a mold edge along the broken line 15.

What is claimed is:

1. A mold for producing a multilayer molded article comprising a resin body and at least one skin material, an edge part of which is present in a surface area of the resin body, said mold comprising:

a single male mold;

a single female mold; and clamping means which is separable from said male and female molds and placed in a molding face of said male mold for clamping an edge part of a skin material or piled edge parts of adjacent skin materials;

wherein one of said male and female molds is provided with receiving means for receiving said clamping means.

2. A mold for producing a multilayer molded article comprising a resin body and at least one skin material, an edge part of which is present in a surface area of the resin body, said mold comprising:

a male mold;

a female mold;

clamping means for clamping an edge part of a skin material or piled edge parts of adjacent skin materials; and a clamping frame for holding a periphery of the skin material.

3. A mold for producing a multilayer molded article, which comprises:

a male mold;

a female mold opposing said male mold; and clamping means for holding an edge part of a skin material;

wherein one of said male and female molds is provided with an engaging groove for receiving said clamping means.

4. The mold according to claim 3, wherein said clamping means has a receiving opening for receiving and securing an edge part of a skin material, said receiving opening including pins disposed across said opening for securing an edge part of a skin material.

5. The mold according to claim 4, wherein said receiving opening is a groove having alternating wide and narrow portions, said wide portions being sufficient to allow resin melt to pass therethrough.

6. A mold assembly for producing a multilayer molded article, said mold assembly comprising:

a male mold;

a female mold opposing said male mold; and clamping means for holding an edge part of a skin material;

wherein said male mold is provided with an engaging groove for receiving said clamping means.

7. The mold assembly according to claim 6, wherein said clamping means has a receiving opening for receiving and securing an edge part of a skin material, said receiving opening including pins disposed across said opening for securing an edge part of a skin material.

8. The mold assembly according to claim 7, wherein said receiving opening is a groove having alternating wide and narrow portions, said wide portions being sufficient to allow resin melt to pass therethrough.

9. The mold assembly according to claim 6, further including a clamping frame surrounding said male mold for holding a periphery of the skin material.

10. The mold assembly according to claim 9, wherein said clamping frame is displaceable with respect to said male mold.

11. The mold according to claim 3, further including a clamping frame surrounding said male mold for holding a periphery of the skin material.

12. The mold according to claim 11, wherein said clamping frame is displaceable with respect to said male mold.

* * * * *

UNITED STATES PATENT AND TRADEMARK OFFICE
CERTIFICATE OF CORRECTION

PATENT NO. : 5,714,175
DATED : February 3, 1998
INVENTOR(S) : Masui et al.

It is certified that error appears in the above-identified patent and that said Letters Patent is hereby corrected as shown below:

On the title page, item [73],:

In the fifth inventor's address, change "Ryuichi" to

--Osaka--.

In the Assignee's name, delete "Hosokawa Seisakusho Co., Ltd. both"

Signed and Sealed this

First Day of June, 1999

Attest:

Attesting Officer

Q. TODD DICKINSON

Acting Commissioner of Patents and Trademarks